Jan. 16, 1934.   E. H. KOCHER   1,943,326
FLUID CONDUIT TERMINAL
Filed April 10, 1925

INVENTOR
Edward H. Kocher
BY
his ATTORNEYS

Patented Jan. 16, 1934

1,943,326

UNITED STATES PATENT OFFICE 1,943,326

FLUID CONDUIT TERMINAL

Edward H. Kocher, Boonton, N. J., assignor to Auto Research Corporation, a corporation of Delaware Application April 10, 1925. Serial No. 22,104

61 Claims. (Cl. 184—7)

My present invention relates primarily to lubricating systems, although it has a wider field of application to other fluid or liquid feed systems.

Among the objects of the invention are to provide a pipe terminal installation embodying reliable flow control or metering instrumentalities, all of small bulk, adequately protected and inobtrusive in use.

Among other objects are to provide a pipe terminal of the type referred to, composed of few parts of simple construction, all readily completed by automatic machines of standard type and without the need for handling between successive operations, and quickly assembled without the need for skilled labor.

Among other objects are to provide a terminal of the type referred to, involving a minimum number of parts or sub-assemblies, that may be combined and mounted with ease to produce the operative installation, and in which the process of installation effects a non-leaking connection, even without the use of gasket material.

Another object is to provide a construction of the type mentioned in which the pipe end need not be of any special soft material or have a specially treated or shaped end, to effect a non-leaking secure mechanical connection.

Unlike the arrangement which involves the threading of one end of the flow controlling unit into the bearing, and the separate threading of the pipe gripping terminal onto the exposed end of the unit, my pipe gripping terminal element is attached directly to the bearing or other terminal supporting structure rather than to the flow control unit, and the latter is securely confined in a corresponding cavity therefor between the supporting structure and the pipe gripping terminal.

In a preferred embodiment, the flow control unit includes an unthreaded metal cartridge of small diameter within which all of the flow control elements are enclosed and the pipe gripping terminal includes a threaded bushing. The cartridge is simply dropped or inserted in a corresponding socket previously formed in the bearing or other terminal supporting structure, the bushing is threaded into the bearing and forces the cartridge into liquid-tight engagement at its inner end with the bearing structure and is conformed at its outlet end to simultaneously effect a compression coupling operation on the previously inserted pipe end which is thereby securely clamped with respect to the cartridge. Thus, a single element rendered effective by a single threading operation connects the cartridge in liquid-tight relation with the bearing, secures the pipe end in liquid-tight relation with respect to the cartridge and houses and protects the cartridge itself.

The cartridge is preferably produced automatically from cylindrical rod stock by an automatic screw machine, all of the operations being performed from one end of the cartridge, so that there is no need for additionally chucking the cartridge elements to finish them after each is cut from the stock. For compactness and simplicity of construction and reliability of operation, the cartridge preferably includes as a flow control element, a restriction pin, fitting with but minute clearance in a bore longitudinally of the cartridge.

The flow control outlets or taps in the run of the line rather than at the extremities thereof, preferably embody flow control cartridges friction-fitted in the threaded stems of appropriate T fittings to the cross-bars of which the main pipe line segments are connected as by appropriate compression couplings.

In the accompanying drawing in which is shown one or more of various possible embodiments of the several features of the invention.

While flow controlling pipe terminals within the scope of my invention are of far wider application, they find their preferred use in centralized lubrication, especially, in the centralized automotive chassis lubricating installations of the specific type shown and claimed in the copending applications of Joseph Bijur, Serial No. 580,668, filed August 9, 1922 and Serial No. 695,740, filed Feb. 28, 1924, which has since issued as Patent No. 1,845,827 under date of February 16, 1932. By my invention, there is brought about a marked simplification in the manufacture, assembly and installation of terminal fittings for the specific purpose of those shown in said prior applications, without, however, in any way impairing or affecting the operation of such systems. Inasmuch as a multiplicity of such fittings are employed in a complete centralized lubricating system, the saving in cost and in labor both in manufacture and installation effected by my invention are substantial.

Figures 1, 2, 3, 4, 5:
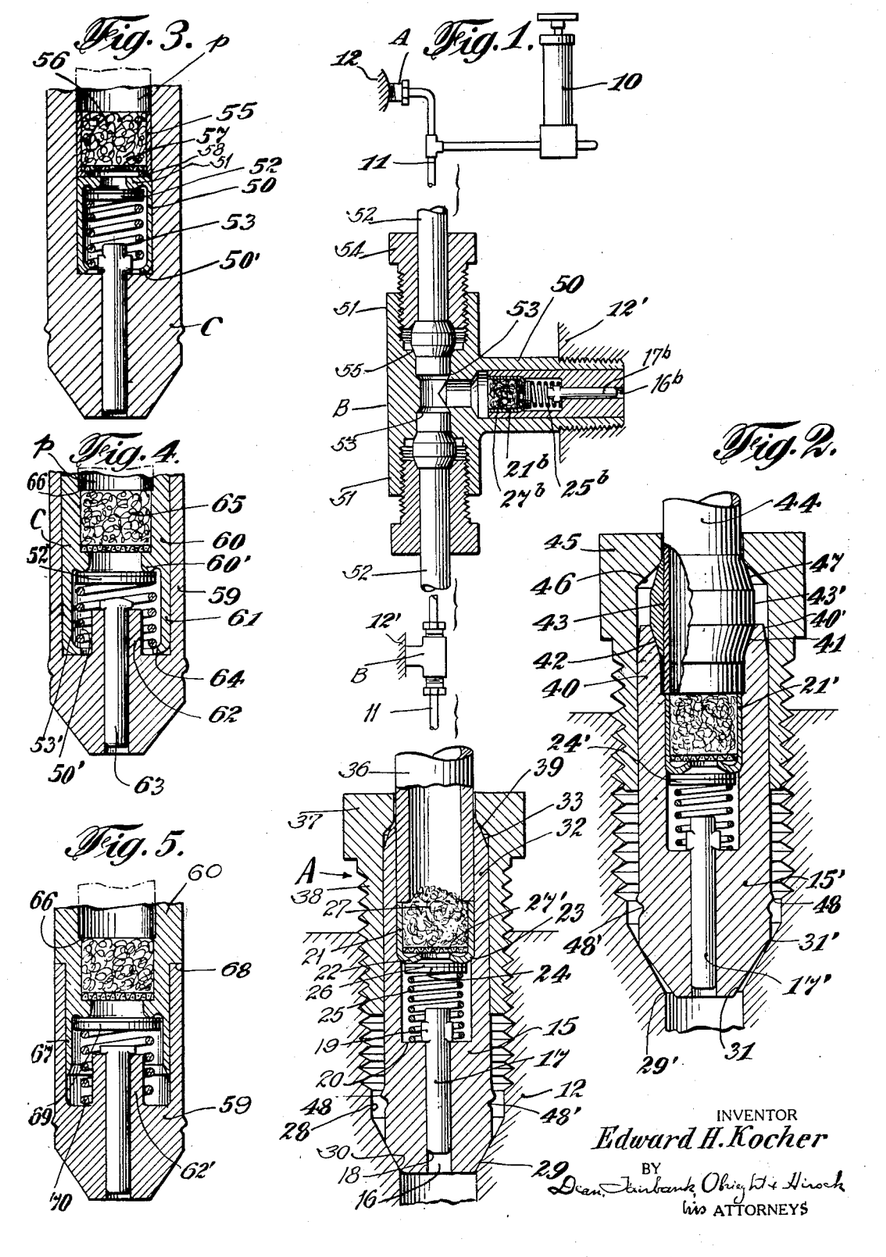
Fig. 1 is a diagrammatic view of a system to which my terminal has a preferred application, showing at A, a desirable form of said terminal applied to the extremity of a pipe line and similarly at B an application of a terminal in the run of the line.
Fig. 2 is a view similar to Fig. 1 of a modified form of terminal.
Figs. 3, 4 and 5 are fragmentary views in longitudinal section of modified forms of flow control cartridges.

The system of the copending applications is indicated diagrammatically in Fig. 1, with my improved fittings shown at A and B, and comprises a suitable source of lubricant pressure 10, supplying a pipe line 11, which may lead to a multiplicity of bearings or other terminal sustaining structures 12, through corresponding outlet terminals in parallel. I have illustratively shown my flow controlling terminal indicated by letter A at extremities of the pipe line, one of which terminals is shown on an enlarged scale at the lower end of the figure. I have also indicated at B a flow control terminal in the run of the line comprising a T fitting, the head of which establishes direct communication through the main length of pipe, segments of which are connected thereto by compression couplings. The stem of the T fitting encloses the flow control instrumentalities which will be more fully described below. The pipe system of an installation equipped with my preferred simplified terminals, in common with those of said copending application, may be normally maintained filled with lubricant by valves embodied in the various flow control instrumentalities, which will be moved off their seats in operation by pressure transmitted from the source, to permit a discharge at a slow rate, accurately controlled by the high resistance due to restriction pins having but minute clearance in corresponding bores in said fittings.

My improved fitting shown at A includes a cartridge 15 housing the various flow controlling instrumentalities. The cartridge is generally cylindrical and includes a longitudinal bore 16 at its outlet end in the order of 3/8" in length within which fits a metal pin 17 of diameter from .002 to .007" smaller than that of the bore, rounded at its outlet end 18 and punched flat to provide lugs 19 sustained on shoulder 20 to support the pin against dropping out from the bore. As in the co-pending applications above-identified, the bore and the pin are both made with a high order of accuracy, so that the cross-sectional area and, accordingly, the resistance to flow of the annular passage therebetween is accurately determined. The cartridge has an enlarged bore beyond said pin within which is friction-fitted a stamping 21 of cup form bent inward at its inner end to form a valve seat 22, said stamping bottoming against a shoulder 23 in the cartridge. Coacting with the valve seat is a disk valve 24 in the cylindrical portion of the bore between said valve seat and the shoulder 20. A relatively long coil spring 25 under substantial compression within said cavity normally urges the valve 24 against its seat 22, the valve having a backing 26 preferably of varnished silk. Within the stamped cup 21, I enclose a plug 27 of felt resting on a metal gauze disk 27', said plug serving as a strainer to prevent the passage of minute particles of scale, dirt or chips to the valve seat or to the restriction pin.

The cartridge is to be applied in a socket 28 previously bored into the bearing or other terminal sustaining structure, said bore having a shoulder or stop 29 at its inner end serving as an abutment for the correspondingly beveled inner end of the cartridge. A single element is applied by a single operation to effect both the assembly of the terminal and the installation thereof. Said element comprises a threaded bushing encircling the pipe 36, having a head 37 and a shank 38 threaded into the correspondingly threaded wall of the socket 28 and fitting snugly about the cartridge 15. The inner end of the head has a bevel 39 and the end of a relatively thin cartridge wall 32 is beveled at 33 at a sharper angle.

To effect the terminal connection described, the cartridge assembly comprising the unit 15 including the restriction pin 17, the valve 24, the valve seat 21, the felt strainer 27 and the spring 25 is dropped or inserted into the socket 28 with its beveled end 30 engaging the beveled end 29 of the socket, whereupon the bushing 38 is threaded partway into the socket, accurately centering the cartridge 15 by reason of its snug engagement with the side wall thereof. The end of pipe 36 is now inserted through the head 37 of the bushing and telescoped into the outer end of cartridge 15 and pushed inward until its extreme end is arrested by the outer end of cup 21. Preferably, the aperture in the bushing head and the inner diameter of the cartridge end embrace the pipe with but small clearance. The assembly is completed by threading the bushing 38 home with one hand, with or without the aid of a wrench, while with the other, the pipe 26 is held against stop 21.

The bushing 38, as shown, centralizes the cartridge 15 and maintains it coaxial with the socket 28, so that the inner end of said cartridge is accurately centered with respect to the reduced end 29 of the socket, and the direct pressure longitudinally of the cartridge exerted by the bushing as it nears home position effects a liquid-tight joint between the cartridge end and the socket. In the process of tightening the bushing, moreover, it will be seen that the beveled end 39 at the head of the bushing will exert a camming or inward pressure effect on the extreme or smaller end of the bevel 33 on the cartridge, forcing the latter inward against the pipe 36 and between the pipe and the bushing and establishing a secure liquid-tight compression coupling connection thereat.

It will be seen that the bushing is an ordinary screw machine part, the valve seat member is an ordinary stamping and the restriction pin is simply cut from a length of wire. The cartridge though of special form can be made, as is apparent, from rod stock by ordinary screw machine operations from one end thereof followed by an ordinary cutting off operation, so that there is no need for separate handling and chucking of partly completed cartridges, as would be incurred if the cartridge were of such construction as to necessitate performing some operation from one end thereof and the rest from the opposite end. The pin 17 in the assembled cartridge terminates short of the outlet end of the bore 16, as shown, thereby dispensing even with the need for deburring the edge of hole 16 after the cartridge is made by the automatic screw machine. The cartridge may be quickly assembled by unskilled labor by the use of appropriate fixtures.

The single threaded bushing thus securely positions and centers the flow controlling cartridge within the socket, establishing a liquid-tight connection thereat and, moreover, effects a secure liquid-tight coupling connection with respect to the pipe. It will be seen that substantially the entire length of the terminal is confined within the socket in the supporting structure 12, the part protruding therebeyond being merely a short unobtrusive length of bushing resembling a union nut.

The fitting B comprises in the embodiment shown a T fitting having a stem 50 preferably threaded in the bearing or other supporting structure 12' and a cross-bar 51, which effects communication between segments 52 of the pipe line. The pipe segments are inserted into the ends of the cross bar 51 and bottom at shoulders 53 and each is secured in position by a corresponding bushing 54 encircling the pipe and threaded into the T, an appropriate compression sleeve 55 about the pipe being rendered effective by the tightening of said bushing.

In the stem of the T fitting, I dispose the flow controlling cartridge which is generally similar to that shown at A, similar parts bearing the same reference numerals with exponent $b$, however. It will be noted that the valve cup 21$b$ extends to the very extremity of the cartridge which is devoid of the pipe clamp extension therebeyond shown at A. Moreover, the cartridge 15$b$ is cylindrical from end to end in outer diameter and may be of diameter smaller than that of fitting A in that it is not called on to resist clamping stresses and can, accordingly, be formed with a relatively thin wall. The cartridge, as shown, is friction-fitted into the cylindrical bore of the stem 50 and may at its outer end extend flush with the end of the stem. The T fitting with the cartridge assembled therein is applied by threading into the bearing, whereupon the pipe terminal connections, previously described, are established. The T fitting 50—51 may be of any appropriate construction, but is preferably of the construction described and claimed in my copending application, Serial No. 37,435, filed June 16, 1925.

In Fig. 2 is shown a modified form of terminal which is my invention only as to those features not shown in the copending applications above referred to, which it has in common with the fitting A in Fig. 1, all other features of the fitting shown in Fig. 2 being the invention of Joseph Bijur. This terminal is specifically claimed in the copending application of Joseph Bijur, Serial No. 155,810, filed December 20, 1926.

In this embodiment the cartridge 15' is generally similar to that of fitting A and includes the restriction pin 17', the valve seat cup 21' and the valve 24' and other associated parts, all bearing the same reference numerals as in fitting A, primed, however. The outlet end of the cartridge is beveled as at 31 and the socket abutment is beveled at a blunter angle, so that the former contacts at its outer edge 31' only against the beveled end or shoulder 29' in the socket. The cartridge is formed with a thicker wall 40 at its inlet end which wall is beveled at 41 at its inner face to afford a wedging engagement with the correspondingly beveled end 42 of the compression sleeve 43 encircling the pipe 44, which pipe as in fitting A abuts the shoulder determined by the end of the cup 21'. The threaded bushing 45 is also beveled at 46 substantially as in fitting A, to engage the end of the bevel 47 on the compression sleeve. The mean radius of the area 31' of engagement of the inner end of the cartridge in the socket is materially greater than that of the bushing bevel 46 with respect to the compression sleeve bevel 47, the purpose and consequence of which arrangement will be apparent in the description of the mode of operation below.

In applying bushing 45, the compression sleeve is forced axially inward into wedging engagement with the beveled end 41 of the cartridge, forcing the outlet end of the latter into oil-tight engagement at 31' with its socket. In this operation, the wedging engagement between the compression coupling sleeve 43 and the cartridge 15' causes the former to act substantially as a rigid part of the latter. By reason of the large effective radius of the annular surface of contact 31' between the cartridge and the socket as compared with the relatively small effective radius of the surface of contact between the bushing bevel 46 and the bevel 47 of the compression coupling, said cartridge with the tightly wedged coupling 43 will be held by a greater frictional force or with greater security with respect to said socket than with respect to said bushing. According, in the rotation of the bushing, the cartridge and the compression coupling will stand still, so that there is no danger, in the process of tightening said bushing of exerting torque upon the pipe and, accordingly, the latter will not be subjected to strain nor will any hollow spring or helical conformation formed rigid with the terminal of the pipe thereby become twisted out of its plane. In the final threading operation, therefore, the beveled inner end 46 of the bushing head will force the outer beveled edge 47 of the compression coupling sleeve 43 inward and will also wedge the extreme end thereof into the clearance space between the pipe and the bushing. The pipe end is thus securely gripped to effect a liquid-tight connection thereat. The wall of the cartridge is sufficiently thick to withstand, without excessive flaring, the wedging force due to the compression sleeve and is tapered at its outer surface as at 40' to avoid gripping the threaded bushing 45. The compression sleeve is cylindrical as at 43' intermediate its bevels 42 and 47, so that there is avoided any excessive expansion of the cartridge which might be incurred were the bevel 42 of substantially greater length than shown.

If, for purpose of repair, it is desired to remove or take apart a terminal fitting or change a drip plug or the length of pipe leading to the same, it is merely necessary to unscrew the bushing 45 and to remove the pipe length, which will readily separate from the cartridge 40, the compression coupling sleeve 43 being, however, securely and substantially irremovably clamped to said pipe. If the pipe length is to be replaced, a new compression coupling sleeve need merely be provided on the substituted length of pipe, and the same control fitting cartridge and threaded bushing can be re-used.

The cartridge 15' is preferably provided with an integral peripheral flange 48 at the region of the restriction pin 17', said flange of larger diameter than the inner diameter of bushing 45. It follows that if the wrong end of the cartridge should be inadvertently introduced into the socket, the bushing cannot be applied.

The flange 48 may be most conveniently formed by rolling a groove 48' circumferentially of the cartridge, the metal displaced in the generation of the groove, forming the protruding bead or flange 48. By this operation, the expense is avoided of using stock of larger diameter and machining it down to provide the flange.

While my invention is not in principle limited to the use of the specific restriction pin flow controlling instrumentality shown in the various embodiments, this construction is preferred, not only because of its reliable action and its simple and inexpensive construction, but because it lends itself readily to the use of small diameter cartridges. In relations in which smallness of bulk and simplicity of construction are not important, it will be understood that the broad features of my invention could be carried out with the use of other flow controlling instrumentalities, such as for instance, measuring valves.

It is understood, of course, that in certain applications, the relief valve element of the flow controlling cartridge shown, may be dispensed with and in other relations, such relief valve may be used to the exclusion of the restriction pin, said valve then constituting the sole flow control element. It is also manifest that any of the control fittings shown, with or without a restriction pin, could be applied directly at an oil reservoir to control the flow therefrom into the head or inlet end of one or more pipes supplied therefrom.

In Figs. 3, 4 and 5 are shown further modifications of cartridges. Only fragments of these are shown, it being understood that the cartridge is applied in a socket as in the other embodiments and that the cut-away parts of the terminal fittings may be identical with the corresponding portions of the fitting A of Fig. 1 or preferably of the fitting of Fig. 2.

In the embodiment of Fig. 3, the internal construction of the flow controlling cartridge comprises preferably a stamped generally cylindrical shell 50 friction-fitted into the bore of the cartridge c and having a turned-in valve seat structure 51 at its outer end formed integral therewith. Valve 52 which may be of the same construction as in the other embodiments is pressed against seat 51 by the expansive force of a coil compression spring 53, the inner end of which reacts against the inturned edge 50′ of the shell. Beyond the valve shell there is disposed a separate shell 55 housing the strainer plug 56, which as in the other embodiments, is backed by a disk of fine wire metal mesh 57 seated against an inturned flange 58 on the shell 55, the edge of said shell serving as the stop for the inner end of the pipe p.

By the construction just described, it will be seen that the valve seat and its spring constitute a sub-assembly which may readily be inspected and tested prior to assembly in the cartridge. Moreover, the valve, the valve seat and spring assembly being a pre-assembled unit may be applied in the cartridge in a single operation. The cartridge mounts the flow controlling restriction pin in a corresponding bore as in Figs. 1 and 2.

In the modification of Fig. 4, the cartridge is formed of two separate machined elements, the outer element 59 having a thin cylindrical wall within which is telescoped the inner cartridge or lining element 60 which extends preferably to the extreme outer end of the outer element and has a thin wall structure 61 near its inner end. A hub extension 62 from the inner end of the cartridge C protrudes into the open end of the lining structure and provides a portion of the length of the bore, which lodges the restriction pin 63.

By this construction, it will be seen that the terminal assembly is substantially shortened with respect to the constructions shown in other embodiments in that a substantial part of the effective length of the restriction passage extends within the coil compression spring 53′ where, in the other embodiments, the entire length of this restriction is beyond the length of the coil compression spring. Moreover, by this arrangement, the valve chamber may be increased in diameter without enlarging the outer diameter of the cartridge, so that a valve 52′ of larger diameter can be employed upon which a greater effective unseating pressure is exerted by operation of the pump, whereby a coil spring exerting a greater seating pressure may be employed. The valve seat 60′ is preferably formed integral with the inner cartridge or lining 60 and the inner end of said cartridge is inturned as at 64 to form a seat for the inner end of the spring. The strainer plug 65 fits into a corresponding cavity in the inner cartridge, which is formed with a shoulder 66 serving as a stop for the inner end of the pipe p.

The modification of Fig. 5 is somewhat similar to that of Fig. 4. Here the cartridge element 59 that carries the restriction pin is relatively short, and the cartridge element 60 that carries the valve seat has a pilot sleeve 67 telescoped at its inner end into the cylindrical wall of the companion element 59 and has a shoulder 68 abutting the extreme end of wall 59. In this embodiment also, the cylindrical wall of cartridge 59 is thin as is the cylindrical inner part 67 of the valve seat carrying cartridge 60, so that a valve 69 of large diameter may be employed, the seating spring 70 of said valve reacting against the restriction pin cartridge 59 which is provided with the hub 62′ as in Fig. 4.

By the expression flow controlling and/or obstructing fitting device, unit or cartridge as utilized in the claims is meant a unitary assembly containing a valve and/or a strainer and/or a restriction. The flow controlling or obstructing instrumentalities are preferably enclosed within a socket or cup-shaped cavity of a connecting member which may be the fixed bearing structure or a part firmly associated therewith.

In one embodiment the fitting with the connecting socket or cup cavity is formed by plugging one end of a longitudinal annular member with a restriction plug, which permits the passage of lubricant or other fluid therethrough at a slow rate.

Referring to Figs. 1 and 2, the sockets or cavities in the bearings may be considered as the connecting sockets while in embodiments such as shown in Figs. 4 and 5, the sockets inside of the fittings containing the restriction pins may be considered as connecting sockets or cup cavities. In the former case, the flow controlling and/or obstructing assembly or fitting contains a restriction, a valve and a filter or strainer, while in the latter case it contains only a strainer and a valve. The fitting shown in Fig. 1, as does also the coupling sleeve, shown in Fig. 2, serves to position correctly and attach together the connecting socket, the coupling unit or bushing and the pipe terminal. It firmly bottoms the arrangement upon the bottom of the rigid member or a ledge within the connecting socket or cup-shaped cavity, and in addition, it serves to crimp the pipe, due to its contact with the coupling unit or bushing. If the fitting were to serve solely as a double tapered coupling device, it would be possible to omit the various flow controlling and obstructing instrumentalities contained therein.

The ledge upon which the flow controlling fitting or double tapered coupling member rests may be at any position within the socket. When the socket is not in a flush bearing element but for example is in a separate fitting, it is possible for the closing bushing or coupling unit to embrace the outside of the walls of the socket instead of plugging the same by being threaded therethrough.

It will be noted that the flow controlling and obstructing fitting, shown in Figs. 1 and 2 has a portion 48 of increased diameter which serves to prevent the cartridge from being placed backwardly within the connecting socket or cup-shaped cavity. The shoulder 68, upon the body portion shown upon Fig. 5, serves a similar purpose inasmuch as it prevents the sub-assembly of a valve and strainer from being placed backwardly within the cavity in the cup restriction assembly.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

I claim:—

1. A flow controlling terminal connection comprising in combination, a terminal carrying support, a mounting element adapted to be secured thereinto, a flow control cartridge housed between said mounting element and said support and fitting at its outer end into a cavity in the inner end of said mounting element, said cartridge carrying strainer means and flow restricting means and a lubricant inlet through said mounting element delivering into said cartridge.

2. In combination a bearing, a mounting fitting adapted to be threaded thereinto, a flow control cartridge extending within a cylindrical bore in said mounting fitting and housed between said fitting and said bearing, and longitudinally compressed therebetween an inlet pipe delivering to said flow control cartridge, and means whereby said inlet pipe is connected to said fitting as an incident of screwing home said fitting.

3. In a lubricating installation, a mounting and flow controlling outlet device comprising a flow control cartridge having a generally cylindrical exterior, a mounting element therefor having a threaded exterior adapted to be applied to a bearing and having an open ended cylindrical bore receiving the outer end of said cartridge, said device including a shoulder forming a stop for the end of a lubricant supply pipe, and coupling means effecting a mechanical fluid-tight connection of said pipe with respect to said device.

4. In a flow controlling pipe terminal connection, in combination a terminal carrying structure, a flow controlling cartridge, and a mounting element adapted to be attached to said structure, said mounting element having a cartridge enclosing part engaging said cartridge and pressing the opposite end thereof against said structure and affording also an inlet for fluid to said cartridge.

5. In combination, a control element adapted to be disposed in a corresponding socket in a terminal carrying structure, a pipe end coaxial with said control element and a bushing encircling said pipe end, threaded into said socket and pressing said element against an abutment in said socket to effect a liquid-tight connection thereat, and means clamping said pipe end in position against movement relative to said control element.

6. A terminal construction for a liquid-conveying pipe, said construction comprising a device including a spring closed liquid pressure-opened valve, said device disposed within a socket in a terminal mounting structure, a bushing encircling the outer part of said device and said pipe and threaded into said socket, thereby confining said device, and means near the outer end of said bushing for grasping said pipe and effecting a liquid-tight connection thereof with respect to said device.

7. An outlet terminal construction for a lubricant feed pipe comprising a terminal cartridge, means enclosed therein effecting a metering action as a consequence of pressure transmitted through the pipe, said means including a spring closed valve normally preventing escape of lubricant from the pipe, a socket of larger diameter in which said cartridge is lodged, said socket affording a stop at its inner end for the corresponding end of said cartridge, a bushing threaded into said socket and of inner diameter substantially equal to the outer diameter of said cartridge to centralize the same, the head of said bushing having an abutting engagement with the end of said cartridge, and retaining the same fixed within said socket, and means for securing said pipe and with respect to said socket.

8. In a fluid distributing system, in combination, a pipe, a terminal fitting for securing an end thereof with respect to a supporting structure, said fitting including a bushing encircling the end of said pipe and tightly disposed in said structure, a flow controlling element extending into said bushing and concentrically with the end of said pipe and retained by said bushing in liquid-tight coaction with said structure, and pipe gripping means near the head of said bushing rendered effective by the application of said bushing.

9. In a lubricating installation, a pipe terminal comprising a flow controlling cartridge and a unitary element adapted to be threadedly attached to a bearing and serving concurrently to clamp a feed pipe in fluid-tight relation with respect to said cartridge, to confine said cartridge and to urge it into fluid-tight relationship with respect to said bearing.

10. In a lubricating system, in combination, a lubricant pipe, a support member, a lubricant control fitting within a socket in said support and a bushing encircling the end of said pipe, threaded into said socket and pressing said control element against the inner end of said socket, said bushing having means for effecting a clamping or gripping connection with respect to said pipe.

11. In a lubricating system, in combination, a bearing, a pipe leading lubricant to said bearing, a flow control element contacting an abutment in a socket in said bearing and in turn affording an abutment for the end of said pipe, and a bushing encircling said pipe, threaded into said socket, pressing said control element against the abutment in said socket and effecting a clamping hold for said pipe.

12. A terminal construction for a liquid-conveying pipe, said construction comprising a bushing encircling the pipe and threaded into a corresponding socket in a terminal mounting structure, a flow control fitting within said socket and urged by said bushing against the inner end of said socket, and compression coupling means disposed between the ends of said threaded bushing, the head of said bushing being conformed to tighten said coupling in the process of applying the bushing in position.

13. An outlet terminal construction for a liquid-conveying pipe, said construction including an outlet fitting having a spring closed valve therein adapted to open under pressure transmitted through the pipe, said fitting constituting a unitary cartridge disposed within a socket in a terminal mounting structure, and a threaded bushing encircling said pipe and a part of said cartridge, and abutting against the outer end of said cartridge to urge the same inward against the inner end of said socket, and means actuated by the head of said bushing and encircling said pipe, exerting pressure on a contiguous portion of the wall of said pipe to effect a liquid-tight connection thereat.

14. An outlet terminal for a liquid-conveying metal pipe, said terminal including a metallic cartridge adapted to bottom against a constricted part of a socket in the terminal mounting structure and having therein a shoulder for abutment of the end of the pipe, a bushing encircling the portion of the pipe immediately beyond said cartridge, and encircling a portion of said cartridge and threaded into the socket, said bushing serving to urge said cartridge into liquid-tight engagement with the constricted part of said socket, said bushing having a camming construction near its head adapted to exert inward pressure against the contiguous portions of the pipe and the cartridge to effect a liquid-tight connection thereat, said pressure being exerted directly upon said cartridge and through said cartridge upon said pipe.

15. A terminal construction for a liquid-feed pipe comprising a mounting structure having a socket, a cylindrical cartridge assembly having flow control means therein and having an annular area of engagement in said socket, a threaded bushing encircling said pipe and said cylindrical cartridge and threaded into said socket, the head of said bushing abutting the end of said cartridge to retain it in position, said bushing being beveled at the inner part of its head, and means actuated by said beveled portion to effect clamping with respect to said pipe as the bushing is threaded to home position.

16. An outlet terminal construction for a lubricant feed pipe comprising a cartridge, means enclosed therein effecting a metering action as a consequence of pressure transmitted through the pipe, said means including a spring closed valve normally preventing escape of lubricant from the pipe, a terminal carrying socket of diameter larger than that of said cartridge, said socket affording a stop at its inner end for the corresponding end of said cartridge, a bushing threaded into said socket and of inner diameter substantially equal to the outer diameter of said cartridge to centralize the same, the head of said bushing having an abutting engagement with the end of said cartridge and retaining the same fixed within said socket, and means adjacent the end of said pipe for effecting a clamping engagement thereof, said means brought into operation by the action of a beveled conformation at the inner side of the head of said bushing.

17. In a terminal construction for a liquid-conveying pipe, in combination, a cartridge inserted within a socket in a terminal carrying structural member, said socket having an abutment for stopping the inner end of said cartridge, a pipe telescoped into the opposite end of said cartridge and having an abutment with respect thereto, a threaded bushing encircling said pipe, and pipe clamping means actuated by the head of said bushing to effect clamping of said pipe in tightening thereof.

18. A terminal for a liquid-conveying pipe comprising a terminal mounting structure having a socket therein, a liquid flow controlling terminal member comprising a cylindrical cartridge in said socket and having substantial clearance at its side walls, said cartridge enclosing a flow controlling instrumentality, which includes a spring-seated valve adapted to open under pressure transmitted through said pipe, a pipe end telescoped into the open end of said cartridge and abutting against an annular stop within said cartridge, a bushing encircling said pipe, threaded into said socket, affording snug engagement with the lateral wall of said cartridge, and having a head engaging the end of said cartridge and forcing the inner end thereof into liquid-tight engagement with the socket, the inner end of said bushing head being beveled, and a pipe clasping structure encircling said pipe and engaged by said beveled head to cause the gripping of said pipe as said bushing is threaded home.

19. An outlet terminal for a liquid-conveying pipe, said terminal including a terminal carrying structure having a socket therein, a cylindrical cartridge in said socket fitting at its inner end at a corresponding abutment of said socket, a valve seat in said cartridge, a valve spring-urged against said seat, a strainer in front of said seat, said seat structure affording an abutment for the extreme end of said pipe, a bushing encircling said pipe, threaded into said socket and having a shank in engagement with the side wall of said cartridge, said bushing having a head exerting pressure against said cartridge to effect a liquid-tight annular area of engagement thereof with the inner end of said socket and compression coupling means actuated by said head to grip said pipe.

20. An outlet terminal for a liquid conveying pipe including a carrying structure having a socket therein with a beveled inner abutment end, a cartridge extending into said socket and having a pin fitting in a longitudinal bore therethrough with minute clearance, said pin having enlargements to prevent dropping thereof through said bore, a cylindrical cup friction-fitted into said cartridge and constituting a valve seat, a valve near said restriction pin spring-urged against said seat, a felt strainer within said cup, a lubricant-conveying pipe telescoped into the open outer end of said cartridge and abutting the end of said seat structure, a bushing encircling said pipe end, threaded into said structure and having a head exerting pressure lengthwise of said cartridge to effect a liquid-tight seat thereof within said socket and compression coupling means about the end of said pipe adjacent the inner end of the head of said bushing and subject to the pressure exerted thereby to effect clamping of said pipe.

21. An outlet terminal for a lubricant-conveying pipe including a mounting structure having a socket therein, a flow control cartridge in said socket, said cartridge having a cylindrical wall at the outer end thereof beveled at its extreme end, said pipe telescoped into said cartridge end and abutting a stop therein, a bushing encircling said pipe and threaded into said socket, said bushing being beveled at the inner side of the head thereof, transmitting longitudinal pressure through said cartridge to force the same into the inner end of said socket and effecting an inward camming action on the beveled end of said cartridge to force the same into liquid-tight secure mechanical engagement with the pipe end.

22. In a terminal member for a liquid-feed pipe, in combination, a cartridge having a longitudinal bore at one end thereof, a cylindrical flow controlling pin therein affording but minute clearance in said bore, said pin having an enlargement beyond said bore to prevent it from dropping out of the cartridge, said cartridge having an enlarged bore beyond said pin, a cup structure affording a valve seat press-fitted in said enlarged bore and engaging a shoulder in said bore, a disk valve between said pin and said seat, a coil spring reacting against the shoulder determining the junction between said enlarged bore and said pin-containing bore and urging said valve against its seat and a plug of felt in said cup serving as a strainer.

23. A flow controlling cartridge including a cylindrical metallic cartridge having a cylindrical valve seat insert press-fitted therein and extending substantially toward one end thereof, a spring-pressed valve within said cartridge urged against said seat, and an outlet passage communicating between said valve and the opposite end of said cartridge.

24. A flow controlling cartridge including a cylindrical metallic cartridge having a cylindrical valve seat insert press-fitted therein and extending substantially toward one end thereof, a spring-pressed valve within said cartridge urged against said seat, and a restriction pin substantially filling a longitudinal bore through the opposite end of said cartridge.

25. In a lubricant flow-controlling fitting, in combination, a cartridge, a cup member press-fitted therein, one end thereof constituting a valve seat, a valve spring-urged against said seat, and a strainer plug of felt filling said cup.

26. In apparatus of the character described, in combination, a terminal cartridge having flow control means in the inner end thereof, a complementary cartridge including a skirt telescoped with respect to said first cartridge and encircling a part of said flow control means, said cartridge having a valve seat unitary therewith, a valve, and a coil compression spring extending within said skirt normally urging said valve against its seat.

27. In apparatus of the character described, in combination, a cartridge having a flow controlling restriction pin in the inner end thereof, a complementary cartridge telescoped into said first cartridge, said complementary cartridge including a unitary valve seat, a disk valve, a coil compression spring urging said valve against its seat, the inner end of said complementary cartridge being inturned to support the corresponding end of the spring, and a felt strainer plug lodged within said first cartridge beyond and near said valve seat.

28. In a flow controlling assembly, in combination, a cartridge including a socket having a hub extending thereinto, a restriction pin extending axially through said hub and through the base of the socket, a valve seat fitting telescoped into said socket, a valve coacting with said seat, and a spring encircling said hub and urging said valve against its seat.

29. In a flow controlling terminal assembly, in combination, a cup-shaped cartridge having an end provided with an axial hub extending toward the rim thereof, a restriction pin supported by said axial hub and extending therethrough and through the end of the fitting, a complementary cartridge member telescoped with respect to said cup member and having a part abutting thereagainst, a valve seat unitary with said secondary cartridge, a valve coacting therewith, a spring encircling said hub and urging said valve against its seat and a strainer plug fitting in a corresponding cavity in said complementary cartridge.

30. In a flow controlling terminal, in combination, a cup-shaped cartridge having a hub unitary therewith extending from the end toward the rim thereof, a restriction pin supported by the end of said hub and extending therethrough and through the end thereof, a complementary cartridge telescoped into said first cartridge and coacting with the end of said cartridge, and a spring encircling said hub and urging said valve against its seat.

31. A flow controlling terminal assembly comprising a supporting cartridge socket having a hub unitary with its end and extending toward its rim, a restriction pin carried by said hub and extending in a corresponding longitudinal axial bore through said hub and said end, a complementary cartridge assembly comprising a strainer plug fitting in a corresponding socket, a valve seat unitary with said complementary fitting, a valve coacting therewith, a spring urging said valve against its seat, said complementary cartridge being inturned at its inner rim to sustain said spring, said inturned part contacting said socket end when the parts are assembled.

32. A flow controlling terminal assembly comprising a cup-shaped cartridge having a hub unitary with the end thereof and extending toward the rim thereof, a restriction pin supported by the end of said hub and extending into a corresponding axial bore through said hub and end, a complementary cartridge fitting having a skirt telescoped into said cup and having a shoulder abutting against the rim of said cup, a valve seat integral with said complementary fitting, a valve coacting therewith, and a spring reacting at one end against said valve and at the other against the end of said cup.

33. In a lubricating installation, a flow controlling and obstructing fitting adapted to be connected to a pipe terminal and a bearing comprising a restriction, a valve and a strainer, said fitting being composed of two axially aligned assemblies, one assembly comprising a cup-shaped member with a bore in the bottom thereof and with a plug in said bore substantially restricting the same and the other assembly including a valve and a strainer enclosed in the cup cavity and largely filling the same, the valve and strainer instrumentalities being encircled by the walls of the cup.

34. In a lubricating installation, a pipe terminal and flow controlling and obstructing construction comprising a socketed connecting member, a flow controlling and obstructing fitting adapted to be positioned within the socket of said connecting member, a pipe end adapted to be connected to said socket, a coupling unit encircling the pipe and holding the pipe end and flow controlling and obstructing fitting in position in respect to the connecting socket, said construction being provided with a double tapered coupling arrangement cooperating with said unit.

35. A drip plug for a central lubricating installation comprising a longitudinal cartridge with a bevelled outlet end to cooperate with the bottom of a mounting socket and cylindrical side walls to cooperate telescopically with a bushing threaded into said socket, said cartridge being provided with a relatively small axial bore at its outlet end and with a relatively large axial socket at its inlet end, a restriction pin substantially filling said small bore and being retained in place against falling out by an enlargement adjacent the inlet end at the portion thereof which projects within said socket, a spring seated valve included in the lower portion of said socket, a cylindrical valve seat member press-fitted into said socket and a strainer element consisting of felt backed by a wire mesh in the outer portion of said socket beyond said valve seat, the outermost end of said socket receiving the pipe end.

36. In a lubricating installation, a pipe terminal and flow controlling and obstructing construction comprising a socketed connecting member, a flow controlling and obstructing fitting adapted to be positioned within the socket of said connecting member, a pipe end adapted to be connected to said socket, a coupling unit encircling the pipe and holding the pipe end and flow controlling and obstructing fitting in position in respect to the connecting socket, said fitting being provided with a projection of large diameter intermediate its ends so that it will be properly placed within the socket of said connecting member.

37. In a terminal member for a liquid-feed pipe, in combination, a cartridge having a longitudinal bore at one end thereof, a cylindrical flow controlling pin therein affording but minute clearance in said bore, said pin having an enlargement beyond said bore to prevent it from dropping out of the cartridge, said cartridge having an enlarged bore beyond said pin, a cup structure affording a valve seat press fitted in said enlarged bore and engaging a shoulder in said bore, a disk valve between said pin and said seat, a coil spring reacting against the shoulder determining the junction between said enlarged bore and said pin-containing bore and urging said valve against its seat and a plug of felt in said cup serving as a strainer, the outlet end of said cartridge being bevelled and the inlet end of said cartridge being formed for coaction with pipe clamping means.

38. A flow controlling unitary cartridge assembly comprising a primary cartridge member comprising a cup-shaped body provided with a central axial bore in said bottom of said cup and metering means carried thereby substantially filling said bore, a secondary cartridge member comprising an annular insert positioned in said cup and embodying a valve seat and a valve and a spring encircled by said primary cartridge, said spring urging said valve against said seat.

39. In a lubricating installation, a flow controlling and obstructing fitting adapted to be connected to a pipe terminal and a bearing comprising a restriction, a valve and a strainer, said fitting being composed of two axially aligned assemblies, one assembly comprising a cup-shaped member with a bore in the bottom thereof and with a plug in said bore substantially restricting the same and the other assembly including a valve and a strainer enclosed in the cup cavity and largely filling the same, the valve and strainer instrumentalities being encircled by the walls of the cup, the valve-strainer assembly having an annular member provided with sockets at each end connected by a short unrestricted passage, one of said sockets containing the strainer and the other of said sockets containing the valve.

40. In a lubricating installation, a flow controlling and obstructing fitting adapted to be connected to a pipe terminal and a bearing comprising a restriction, a valve and a strainer, said fitting being composed of two axially aligned assemblies, one assembly comprising a cup-shaped member with a bore in the bottom thereof and with a plug in said bore substantially restricting the same and the other assembly including a valve and a strainer enclosed in the cup cavity and largely filling the same, the valve and strainer instrumentalities being encircled by the walls of the cup, the cup-shaped assembly affording an annular stop for the enclosed assembly.

41. In a lubricating installation, a flow controlling and obstructing fitting adapted to be connected to a pipe terminal and a bearing comprising a restriction, a valve and a strainer, said fitting being composed of two axially aligned assemblies, one assembly comprising a cup-shaped member with a bore in the bottom thereof and with a plug in said bore substantially restricting the same and the other assembly including a valve and a strainer enclosed in the cup cavity and largely filling the same, the valve and strainer instrumentalities being encircled by the walls of the cup, the cup cavity in the restriction assembly receiving said pipe terminal, said pipe terminal telescoping with the valve and strainer assembly.

42. In a lubricating installation, a flow controlling and obstructing fitting adapted to be connected to a pipe terminal and a bearing comprising a restriction, a valve and a strainer, said fitting being composed of two axially aligned assemblies, one assembly comprising a cup-shaped member with a bore in the bottom thereof and with a plug in said bore substantially restricting the same and the other assembly including a valve and a strainer enclosed in the cup cavity and largely filling the same, the valve and strainer instrumentalities being encircled by the walls of the cup, a bushing being utilized to connect said fitting to said pipe terminal.

43. In a lubricating installation, a pipe terminal and flow controlling and obstructing construction comprising a beveled socketed connecting member, a flow controlling and obstructing fitting adapted to be positioned within the socket of said connecting member, a pipe end connected to said socket, a coupling unit including a threaded nut having a clamping bevel encircling the pipe and holding the pipe end and flow controlling and obstructing fitting in position in respect to the connecting socket, said construction being provided with a double tapered coupling arrangement cooperating with said unit, the flow controlling and obstructing fitting, the pipe end and the bushing being permanently clamped together by the cooperation of the coupling arrangement and the bevels on the coupling unit and the connecting member, said bevels and tapers being arranged so that the bevel on the connecting member and the cooperating taper will both be at substantially the same angle to the axis of the pipe terminal while the bevel on the bushing and the other cooperating taper will be at substantially diverging angles to each other.

44. In a lubricating installation, a pipe terminal and flow controlling and obstructing construction comprising a beveled socketed connecting member, a flow controlling and obstructing fitting adapted to be positioned within the socket of said connecting member, a pipe end connected to said socket, a coupling unit including a threaded nut, having a clamping bevel encircling the pipe and holding the pipe end and flow controlling and obstructing fitting in position in respect to the connecting socket, said construction being provided with a double tapered coupling arrangement cooperating with said unit, the coupling arrangement contacting with its innermost tapered surface upon the bevel of said socket to form a lubricant-tight connection.

45. In a lubricating installation, a pipe terminal and flow controlling and obstructing construction comprising a beveled socketed connecting member, a flow controlling and obstructing fitting adapted to be positioned within the socket of said connecting member, a pipe end connected to said socket, a coupling unit including a threaded nut having a clamping bevel, encircling the pipe and holding the pipe end and flow controlling and obstructing fitting in position in respect to the connecting socket, said construction being provided with a double tapered coupling arrangement cooperating with said unit, the coupling arrangement including a separate sleeve encircling the pipe and positioned between and contacting with the flow controlling and obstructing fitting and the coupling unit, the contact of the coupling sleeve at its inner end being along a frusto-conical surface and at its outer end being along a narrow circular surface.

46. In a lubricating installation, a pipe terminal and flow controlling and obstructing construction comprising a beveled socketed connecting member, a flow controlling and obstructing fitting adapted to be positioned within the socket of said connecting member, a pipe end connected to said socket, a coupling unit including a threaded nut having a clamping bevel encircling the pipe and holding the pipe end and flow controlling and obstructing fitting in position in respect to the connecting socket, said construction being provided with a double tapered coupling arrangement cooperating with said unit, the flow controlling and obstructing fitting being provided with a portion of enlarged diameter intermediate its ends to prevent inverted positioning within the socket of said connecting member.

47. In a lubricating installation, a pipe terminal and flow controlling and obstructing construction comprising a beveled socketed connecting member, a flow controlling and obstructing fitting adapted to be positioned within the socket of said connecting member, a pipe end connected to said socket, a coupling unit including a threaded nut having a clamping bevel encircling the pipe and holding the pipe end and flow controlling and obstructing fitting in position in respect to the connecting socket, said construction being provided with a double tapered coupling arrangement cooperating with said unit, the socket of the connecting member being provided with a ledge and the flow controlling and obstructing fitting being clamped between and directly contacting with the ledge and the interior end of the coupling unit.

48. In apparatus of the character described, in combination, a flow control cartridge having flow control means, a complementary cartridge having a part telescoped within said first cartridge and including a relief valve and seat assembly, the relief valve assembly comprising a valve seat unitary with the complementary cartridge, a valve, a coil compression spring urging said valve against its seat, the inner end of said cartridge being inturned to accommodate the corresponding end of the spring.

49. A flow controlling terminal assembly comprising a cup-shaped cartridge having a hub unitary with the end thereof and extending toward the rim thereof, a restriction pin supported by the end of said hub and extending into a corresponding axial bore through said hub and end, a complementary cartridge fitting having a skirt telescoped into said cup and having a shoulder abutting against the rim of said cup, a valve seat integral with said complementary fitting, a valve coacting therewith, a spring reacting at one end against said valve and at the other against the end of said cup, and a strainer fitted in a corresponding socket in said complementary cartridge, said complementary cartridge embodying a shoulder near the end of said strainer, serving as a stop for the end of the fluid supply pipe.

50. In a lubricating pipe terminal connection, in combination, a socketed terminal structure, a cap-like mounting element to be attached thereto provided with an opening in the top thereof, a pipe end extending into said opening in the mounting element and a longitudinal flow impeding element housed between said terminal structure and said mounting element and clamped between the bottom of the socket and the top of the cap at the ends of the element.

51. In a lubricating installation, a pipe terminal comprising a flow controlling cartridge and a unitary element adapted to be threadedly attached to a bearing and serving concurrently to clamp a feed pipe in fluid-tight relationship with respect to said cartridge, to confine said cartridge and to urge it into fluid-tight relationship with respect to said bearing, the feed pipe being telescoped inside of the inlet end of the flow controlling cartridge and the edge of the flow controlling cartridge around said feed pipe being crimped inwardly thereabout.

52. A terminal construction for a liquid-conveying pipe, said construction comprising a bushing encircling the pipe and threaded into a corresponding socket in a terminal mounting structure, a flow control fitting within said socket and urged by said bushing against the inner end of said socket, and compression coupling means disposed between the ends of said threaded bushing, the head of said bushing being conformed to tighten said coupling in the process of applying the bushing in position, the compression coupling means forming an integral part of the flow controlling fitting.

53. In a terminal construction for a liquid-conveying pipe, in combination, a cartridge inserted within a socket in a terminal carrying structural member, said socket having an abutment for stopping the inner end of said cartridge, a pipe telscoped into the opposite end of said cartridge and having an abutment with respect thereto, a threaded bushing encircling said pipe, and pipe clamping means actuated by the head of said bushing to effect clamping of said pipe in tightening thereof, the bushing and the socket being threaded together to form an elongated cavity between the ends of which cavity the cartridge is clamped.

54. In a terminal construction for a liquid-conveying pipe, in combination, a cartridge inserted within a socket in a terminal carrying structural member, said socket having an abutment for stopping the inner end of said cartridge a pipe telescoped into the opposite end of said cartridge and having an abutment with respect thereto, a threaded bushing encircling said pipe, and pipe clamping means actuated by the head of said bushing to effect clamping of said pipe in tightening thereof, the cartridge being unthreaded and being clamped in position by the threaded connection between the socket and the bushing.

55. In a terminal construction for a liquid-conveying pipe, in combination, a cartridge inserted within a socket in a terminal carrying structural member, said socket having an abutment for stopping the inner end of said cartridge, a pipe telescoped into the opposite end of said cartridge and having an abutment with respect thereto, a threaded bushing encircling said pipe, and pipe clamping means actuated by the head of said bushing to effect clamping of said pipe in tightening thereof, the bushing being provided with a socket within which socket said cartridge is telescoped.

56. A flow controlling unit comprising a pair of cartridge elements, one of said elements comprising a cup-shaped body provided with a central axial bore in said bottom of said cup and a flow control means substantially filling said bore, the other of said elements comprising an annular insert positioned in said cup, a second flow control means located within said annular insert, said two elements telescoped with respect to each other and the second element being press-fitted into the first element.

57. In a flow controlling resistance unit, in combination, a cup-shaped outer body having an axial bore through the base thereof, an annular inner body fitting in the cup of said outer body having socket portions in both ends, a restriction element in said axial bore and strainer and valve elements respectively in said socket portions.

58. A flow controlling unit comprising a pair of cartridge elements, one of said elements being cup-shaped and comprising a flow control means, the other of said elements fitting into said cup-element comprising a second flow control means, the first element containing a restriction and the second element containing a valve and a strainer.

59. A flow controlling unit comprising a pair of cartridge elements, one of said elements comprising a cup-shaped body provided with a central axial bore in said bottom of said cup-shaped body and a flow control means substantially filling said bore, the other of said elements comprising an annular insert positioned in the cup of said body and a second flow control means enclosed in said annular insert, said two elements being telescoped with respect to each other to form a unitary fitting.

60. In a lubricating installation, a pipe terminal and flow controlling and obstructing construction, comprising a connecting member having a threaded socket with a shelf-like bevel inside of the threaded portion of said socket, a flow controlling and obstructing device positioned within the socket of said connecting member, a feed pipe end connected to said socket and to said device, a coupling nut including a threaded sleeve element screwed to said threaded socket and having a clamping bevel at the end of the sleeve element, encircling the pipe and holding the pipe end and flow controlling and obstructing fitting in position in respect to the socket in the connecting member, said construction being provided with a double tapered coupling sleeve arrangement cooperating with said nut, one of said tapers coacting with the clamping bevel upon said coupling nut to crimp the pipe end, the bevel on the coupling nut being at a substantially greater angle to the axis of the flow controlling fitting than said coacting taper, as a result of which said bevel and taper will contact at a point closely adjacent to the place at which the pipe is crimped and the other taper of said double tapered coupling sleeve arrangement coacting with the shelf-like bevel of the socket of said connecting member.

61. A lubricant control fitting combination comprising a terminal carrying support with a threaded socket having a shelf-like bevel, a protective externally threaded cap element screwed into the terminal carrying support, being provided with a central bore at its upper end for receiving an inlet pipe, a thin-walled substantially cylindrical unthreaded cartridge having a central passage and containing a plurality of flow controlling instrumentalities enclosed in said passage, said cartridge being protected from injury by said threaded cap element and being provided with a compression coupling means whereby it is clamped in position between, with its ends contacting, the shelf-like bevel of said socket and the upper end of said cap element.

EDWARD H. KOCHER.